(12) United States Patent
Takahashi

(10) Patent No.: US 10,732,325 B2
(45) Date of Patent: Aug. 4, 2020

(54) HYDROPHILIC MULTILAYER FILM AND METHOD FOR PRODUCING SAME, AND IMAGING SYSTEM

(71) Applicant: FUJIFILM Corporation, Tokyo (JP)

(72) Inventor: Hiroki Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 15/938,081

(22) Filed: Mar. 28, 2018

(65) Prior Publication Data

US 2018/0217299 A1 Aug. 2, 2018

Related U.S. Application Data

(63) Continuation of application No. PCT/JP2016/068914, filed on Jun. 24, 2016.

(30) Foreign Application Priority Data

Sep. 29, 2015 (JP) .................................. 2015-192236

(51) Int. Cl.
   *G02B 1/18* (2015.01)
   *G02B 1/116* (2015.01)
   *G02B 1/115* (2015.01)

(52) U.S. Cl.
   CPC .............. *G02B 1/116* (2013.01); *G02B 1/115* (2013.01); *G02B 1/18* (2015.01)

(58) Field of Classification Search
   CPC ............ G02B 1/115; G02B 1/116; G02B 1/18
   (Continued)

(56) References Cited

U.S. PATENT DOCUMENTS 5,854,708 A * 12/1998 Komatsu ................ C03C 17/256
                                                                        359/512
5,939,194 A   8/1999 Hashimoto et al.
(Continued)

FOREIGN PATENT DOCUMENTS

CN        102026802 A     4/2011
CN        103648646 A     3/2014
(Continued)

OTHER PUBLICATIONS

Chinese Search Report and Office Action, dated Jul. 3, 2019, for corresponding Chinese Application No. 201680056428.5, with an English translation of the Chinese Search Report.
(Continued)

*Primary Examiner* — Ricky D Shafer
(74) *Attorney, Agent, or Firm* — Birch, Stewart, Kolasch & Birch, LLP

(57) ABSTRACT

A hydrophilic multilayer film is provided on a substrate, the hydrophilic multilayer film having a multilayer film layer in which at least two kinds of layers having different refractive indices are laminated in order from the substrate side such that at least one or more of each kind of layer are laminated; and a hydrophilic thin film layer provided on the surface of the multilayer film layer. The multilayer film layer has one or more photocatalyst layers, and one layer of the photocatalyst layers is provided adjacently to the hydrophilic thin film layer. The hydrophilic thin film layer has a columnar structure having gaps extending between the top surface of the hydrophilic multilayer film and the face adjacent to the photocatalyst layer, and one or more of the photocatalyst layers included in the multilayer film layer has an oblique columnar structure including gaps oblique to the thickness direction.

13 Claims, 9 Drawing Sheets

(58) Field of Classification Search
USPC .................................................. 359/507, 900
See application file for complete search history.

(56) References Cited

U.S. PATENT DOCUMENTS

| | | | |
|---|---|---|---|
| 6,013,372 A | 1/2000 | Hayakawa et al. | |
| 6,090,489 A | 7/2000 | Hayakawa et al. | |
| 6,193,378 B1* | 2/2001 | Tonar | B60R 1/0602 359/603 |
| 6,349,833 B1 | 2/2002 | Oyama et al. | |
| 6,425,670 B1* | 7/2002 | Komatsu | C03C 17/36 359/507 |
| 6,524,664 B1 | 2/2003 | Hashimoto et al. | |
| 6,525,882 B1* | 2/2003 | Yamamoto | G02B 5/08 359/507 |
| 6,742,902 B2* | 6/2004 | Kikuchi | G02B 1/18 359/512 |
| 6,830,785 B1 | 12/2004 | Hayakawa et al. | |
| 7,004,591 B2* | 2/2006 | Kobayashi | A47G 1/02 359/507 |
| 2002/0016250 A1 | 2/2002 | Hayakawa et al. | |
| 2002/0104783 A1 | 8/2002 | Oyama et al. | |
| 2005/0019700 A1 | 1/2005 | Hayakawa et al. | |
| 2011/0014432 A1 | 1/2011 | Terada | |
| 2014/0135209 A1 | 5/2014 | Kaburagi et al. | |
| 2015/0192723 A1 | 7/2015 | Takahashi | |
| 2015/0226881 A1 | 8/2015 | Takahashi et al. | |
| 2015/0293268 A1 | 10/2015 | Nakamura et al. | |

FOREIGN PATENT DOCUMENTS

| | | |
|---|---|---|
| CN | 104797416 A | 7/2015 |
| JP | 8-220305 A | 8/1996 |
| JP | 10-330131 A | 12/1998 |
| JP | 2865065 B2 | 3/1999 |
| JP | 2000-326440 A | 11/2000 |
| JP | 2003-10696 A | 1/2003 |
| JP | 2005-165014 A | 6/2005 |
| JP | 2007-187785 A | 7/2007 |
| JP | 4491656 B2 | 6/2010 |
| WO | WO 2014/050408 A1 | 4/2014 |
| WO | WO 2014/065371 A1 | 5/2014 |

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/068914, dated Apr. 12, 2018, with English translation.
International Search Report and English translation (Form PCT/ISA/210) for Application No. PCT/JP2016/068914, dated Sep. 20, 2016.
Japanese Notification of Reasons for Refusal and English translation for Application No. 2017-542939, dated Oct. 3, 2017.
Tamaru et al., "Antireflection Film with Self-cleaning Function for Outdoor-use," Panasonic Electric Works Technical Report, vol. 59, No. 1, Mar. 2011, pp. 60-64, with English abstract.

* cited by examiner

FIG. 7

| | | MATERIAL | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|---|---|
| HYDROPHILIC THIN FILM LAYER 103 | | SiO₂ | 88 | 106 | 85 | 91 | 102 | 84 | 88 |
| MULTILAYER FILM LAYER 101 | FIRST LAYER | TiO₂ | 32 | 23 | 106 | 31 | 26 | 103 | 30 |
| | SECOND LAYER | SiO₂ | 6 | 46 | 30 | 8 | 39 | 183 | 6 |
| | THIRD LAYER | TiO₂ | 67 | 16 | 14 | 71 | 20 | 31 | 67 |
| | FOURTH LAYER | SiO₂ | 30 | 229 | 141 | 20 | 206 | 31 | 30 |
| | FIFTH LAYER | TiO₂ | 13 | 4 | - | 22 | 10 | 27 | 13 |
| | SIXTH LAYER | SiO₂ | 172 | 207 | - | 12 | 23 | 183 | 172 |
| SUBSTRATE 10 | | | D 263 T | D 263 T | D 263 T | FD110 | FD110 | FD110 | D 263 T |
| AVERAGE REFLECTANCE (400-700nm) | | | 0.18 | 0.41 | 0.38 | 0.24 | 0.33 | 0.33 | 0.18 |
| HYDROPHILICITY (CONTACT ANGLE [deg.]) | | | 7.5 | 7.8 | 5.1 | 4.1 | 7.6 | 5.2 | 15.2 |
| ABRASION RESISTANCE (RUBBING TEST) | | | A | A | A | A | A | A | A |

FIG. 8

| | | MATERIAL | EXAMPLE 7 | EXAMPLE 8 | EXAMPLE 9 | EXAMPLE 10 | COMPARATIVE EXAMPLE 1 |
|---|---|---|---|---|---|---|---|
| HYDROPHILIC THIN FILM LAYER 103 | | SiO₂ | 88 | 85 | 91 | 84 | 88 |
| MULTILAYER FILM LAYER 101 | FIRST LAYER | TiO₂ | 28 | 102 | 26 | 98 | 30 |
| | SECOND LAYER | SiO₂ | 6 | 30 | 8 | 183 | 6 |
| | THIRD LAYER | TiO₂ | 70 | 18 | 75 | 35 | 67 |
| | FOURTH LAYER | SiO₂ | 30 | 141 | 20 | 31 | 30 |
| | FIFTH LAYER | TiO₂ | 13 | - | 22 | 27 | 13 |
| | SIXTH LAYER | SiO₂ | 172 | - | 12 | 183 | 172 |
| SUBSTRATE 10 | | | D 263 T | D 263 T | FD110 | FD110 | D 263 T |
| AVERAGE REFLECTANCE (400-700nm) | | | 0.18 | 0.38 | 0.24 | 0.33 | 0.18 |
| HYDROPHILICITY (CONTACT ANGLE [deg.]) | | | 8.2 | 8.8 | 6.2 | 6.4 | 15.2 |
| ABRASION RESISTANCE (RUBBING TEST) | | | A | A | A | A | A |

FIG. 9

| | | MATERIAL | EXAMPLE 11 | EXAMPLE 12 | COMPARATIVE EXAMPLE 2 |
|---|---|---|---|---|---|
| HYDROPHILIC THIN FILM LAYER 103 | | SiO$_2$ | 91 | 84 | 91 |
| MULTILAYER FILM LAYER 101 | FIRST LAYER | TiO$_2$ | 26 | 98 | 26 |
| | SECOND LAYER | SiO$_2$ | 8 | 183 | 8 |
| | THIRD LAYER | TiO$_2$ | 71 | 31 | 71 |
| | FOURTH LAYER | SiO$_2$ | 20 | 31 | 20 |
| | FIFTH LAYER | TiO$_2$ | 27 | 32 | 32 |
| | SIXTH LAYER | SiO$_2$ | 12 | 183 | 12 |
| SUBSTRATE 10 | | | FD110 | FD110 | FD110 |
| AVERAGE REFLECTANCE (400-700nm) | | | 0.24 | 0.33 | 0.24 |
| HYDROPHILICITY (CONTACT ANGLE [deg.]) | | | 9.8 | 9.5 | 16.6 |
| ABRASION RESISTANCE (RUBBING TEST) | | | A | A | A |

FIG. 10

| | | MATERIAL | EXAMPLE 13 | EXAMPLE 14 | COMPARATIVE EXAMPLE 2 |
|---|---|---|---|---|---|
| HYDROPHILIC THIN FILM LAYER 103 | | SiO$_2$ | 91 | 84 | 91 |
| MULTILAYER FILM LAYER 101 | FIRST LAYER | TiO$_2$ | 31 | 103 | 26 |
| | SECOND LAYER | SiO$_2$ | 8 | 183 | 8 |
| | THIRD LAYER | TiO$_2$ | 75 | 35 | 71 |
| | FOURTH LAYER | SiO$_2$ | 20 | 31 | 20 |
| | FIFTH LAYER | TiO$_2$ | 22 | 27 | 32 |
| | SIXTH LAYER | SiO$_2$ | 12 | 183 | 12 |
| SUBSTRATE 10 | | | FD110 | FD110 | FD110 |
| AVERAGE REFLECTANCE (400-700nm) | | | 0.24 | 0.33 | 0.24 |
| HYDROPHILICITY (CONTACT ANGLE [deg.]) | | | 3.8 | 4.6 | 16.6 |
| ABRASION RESISTANCE (RUBBING TEST) | | | A | A | A |

FIG. 11

| | | MATERIAL | EXAMPLE 15 | EXAMPLE 16 | COMPARATIVE EXAMPLE 3 |
|---|---|---|---|---|---|
| HYDROPHILIC THIN FILM LAYER 103 | | SiO$_2$ | 89 | 88 | 86 |
| MULTILAYER FILM LAYER 101 | FIRST LAYER | TiO$_2$ | 106 | 103 | 102 |
| | SECOND LAYER | SiO$_2$ | 30 | 183 | 30 |
| | THIRD LAYER | TiO$_2$ | 14 | 31 | 14 |
| | FOURTH LAYER | SiO$_2$ | 141 | 31 | 141 |
| | FIFTH LAYER | TiO$_2$ | – | 27 | – |
| | SIXTH LAYER | SiO$_2$ | – | 183 | – |
| SUBSTRATE 10 | | | D 263 T | FD110 | D 263 T |
| AVERAGE REFLECTANCE (400–700nm) | | | 0.38 | 0.33 | 0.38 |
| HYDROPHILICITY (CONTACT ANGLE [deg.]) | | | 2.6 | 4.3 | 15.2 |
| ABRASION RESISTANCE (RUBBING TEST) | | | B | B | B |

HYDROPHILIC MULTILAYER FILM AND METHOD FOR PRODUCING SAME, AND IMAGING SYSTEM

CROSS REFERENCE TO RELATED APPLICATIONS

This is a continuation of International Application No. PCT/JP2016/068914 filed on Jun. 24, 2016, and claims priority from Japanese Patent Application No. 2015-192236 filed on Sep. 29, 2015, the entire disclosures of which are incorporated herein by reference.

BACKGROUND OF THE INVENTION

1. Field of the Invention

The present invention relates to a hydrophilic multilayer film provided on a surface of a substrate, a method for producing the multilayer film, and an imaging system.

2. Description of the Related Art

It is desirable that members such as lenses that are used outdoors or windowpanes have a so-called self-cleaning function, by which rain water that has wetted the surface of a member raises and removes dirt on a rainy day, in addition to optical functions such as an antireflection function. Therefore, in the structural body described in JP2007-187785A, a $TiO_2$ layer is formed on a porous $SiO_2$ layer, and the $SiO_2$ layer is formed from a single layer of $SiO_2$ particles that are two-dimensionally spread, or a multilayer obtained by laminating the single layers. According to the configuration of this structural body, the $TiO_2$ layer of the upper layer retains a self-cleaning function, while the porous $SiO_2$ layer of the underlayer exhibits an antireflection function. Also in the antireflection filter described in JP1996-220305A (JP-H08-220305A), a semiconductor photocatalyst such as titanium oxide, zinc oxide, iron oxide, or tungsten oxide is deposited on an antireflection film in order to maintain stainproofing performance for a long time period.

SUMMARY OF THE INVENTION

In a case in which a photocatalyst such as titanium oxide is formed in the outermost layer as in the case of JP2007-187785A or JP1996-220305A (JP-H08-220305A) described above, sufficient low-reflection characteristics cannot be obtained due to the high refractive index of the photocatalyst, and there is a problem that hydrophilicity is not manifested at night. Meanwhile, in the antireflection film for outdoor use described in TAMARU, Hiroshi, et al., "Antireflection Film with Self-Cleaning Function for Outdooruse", Vol. 59, No. 1 (issue of March, 2011), Panasonic Electric Works Technical Report [online], [retrieved on Sep. 24, 2015], Internet webpage <URL: http://www.panasonic-.com/jp/corporate/technology-design/ptj/pdf/591_11.pdf>, a layer of low refractive index is employed as the outermost layer, and a photocatalyst layer formed from a high-refractive index material such as $TiO_2$ is laminated as an underlayer of the layer of low refractive index, while the outermost layer is formed so as to have a porous structure. An antireflection effect is obtained by disposing a layer of low refractive index as the outermost layer and disposing a layer of high refractive index as an underlayer thereof, and hydrophilicity is obtained by allowing the outermost layer to have a porous structure. However, the photocatalyst layer is utilized in a state of having the oxidative decomposition activity of the photocatalyst layer mostly blocked by the layer of low refractive index having a porous structure. Accordingly, in order to sufficiently realize the self-cleaning function by means of the photocatalyst, it is required to enhance the effect of the photocatalyst layer itself as high as possible, and this is not efficient. Furthermore, in a case in which the outermost surface is wiped strongly, the porous structure may be destroyed, and there has been a problem with practical usability from the viewpoint of abrasion resistance.

The present invention was achieved in view of such circumstances as described above, and an object of the invention is to provide a hydrophilic multilayer film that can achieve a balance between high hydrophilicity and efficient self-cleaning function while maintaining high abrasion resistance; a method for producing the hydrophilic multilayer film; and an imaging system.

A hydrophilic multilayer film according to an aspect of the invention is a hydrophilic multilayer film provided on a surface of a substrate, the hydrophilic multilayer film comprising, in sequence from the substrate side, a multilayer film layer in which at least two kinds of layers having different refractive indices are laminated such that at least one or more layers of each kind of layer are laminated; and a hydrophilic thin film layer provided on the surface of the multilayer film layer, wherein the multilayer film layer has one or more photocatalyst layers, and one layer of the photocatalyst layers is provided adjacently to the hydrophilic thin film layer, the hydrophilic thin film layer has a columnar structure, and one or more of the photocatalyst layers included in the multilayer film layer have an oblique columnar structure.

An imaging system according to another aspect of the invention comprises the hydrophilic multilayer film as an antireflection film on a face that is in contact with the outside air.

A method for producing a hydrophilic multilayer film according to still another aspect of the invention is a method for producing a hydrophilic multilayer film having, on a surface of a substrate, a multilayer film layer in which at least two kinds of layers having different refractive indices are laminated in sequence from the substrate side such that at least one or more layers of each kind of layer are laminated; and a hydrophilic thin film layer provided on the surface of the multilayer film layer, in which the multilayer film layer has one or more photocatalyst layers, and one layer of the photocatalyst layers is provided adjacently to the hydrophilic thin film layer, the method comprising forming one or more of the photocatalyst layers included in the multilayer film layer by inclined deposition.

According to the invention, a hydrophilic multilayer film that can achieve a balance between high hydrophilicity and an efficient self-cleaning function while maintaining high abrasion resistance, a method for producing the hydrophilic multilayer film, and an imaging system can be provided.

BRIEF DESCRIPTION OF THE DRAWINGS

FIG. 7 is a table showing the layer configurations of the substrate and the hydrophilic multilayer film for Examples 1 to 6 and Comparative Example 1, the materials and film thicknesses [nm] of the various layers, and the average reflectivity, hydrophilicity and abrasion resistance of the various Examples and Comparative Example 1.

FIG. 8 is a table showing the layer configurations of the substrate and the hydrophilic multilayer film for Examples 7 to 10 and Comparative Example 1, the materials and film thicknesses [nm] of the various layers, and the average reflectivity, hydrophilicity and abrasion resistance of the various Examples and Comparative Example 1.

FIG. 9 is a table showing the layer configurations of the substrate and the hydrophilic multilayer film for Examples 11 and 12 and Comparative Example 2, the materials and film thicknesses [nm] of the various layers, and the average reflectivity, hydrophilicity and abrasion resistance of the various Examples and Comparative Example 2.

FIG. 10 is a table showing the layer configurations of the substrate and the hydrophilic multilayer film for Examples 13 and 14 and Comparative Example 2, the materials and film thicknesses [nm] of the various layers, and the average reflectivity, hydrophilicity and abrasion resistance of the various Examples and Comparative Example 2.

FIG. 11 is a table showing the layer configurations of the substrate and the hydrophilic multilayer film for Examples 15 and 16 and Comparative Example 3, the materials and film thicknesses [nm] of the various layers, and the average reflectivity, hydrophilicity and abrasion resistance of the various Examples and Comparative Example 3.

DESCRIPTION OF THE PREFERRED EMBODIMENTS

Hereinafter, embodiments of the invention will be described with reference to the drawings.

Figure 1:
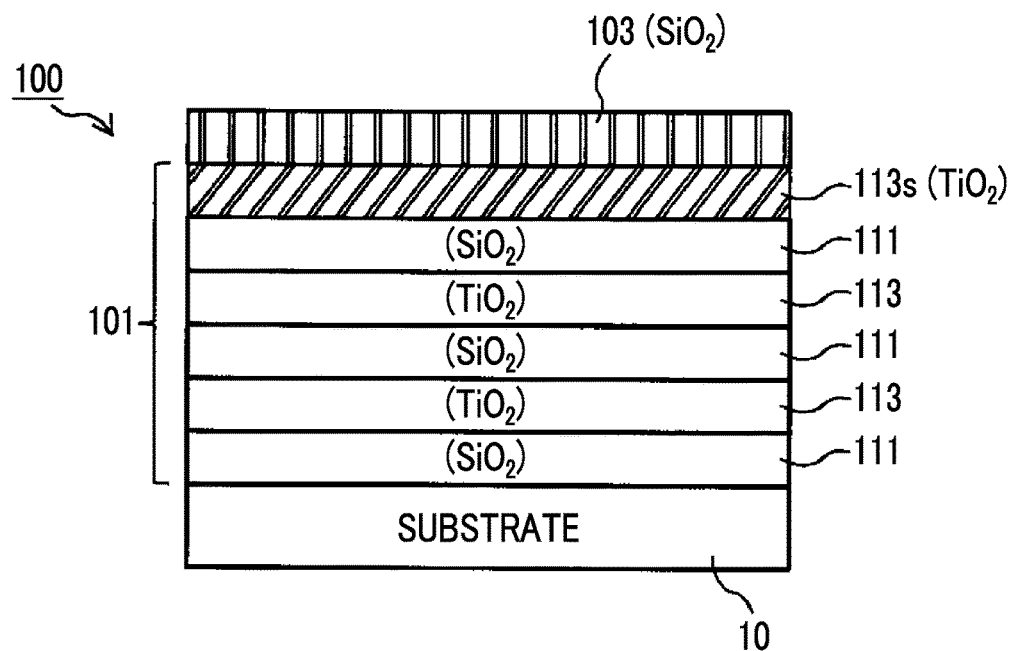
FIG. 1 is a schematic cross-sectional view illustrating an example of the outline configuration of a hydrophilic multilayer film according to an embodiment of the invention.
Figure 2:
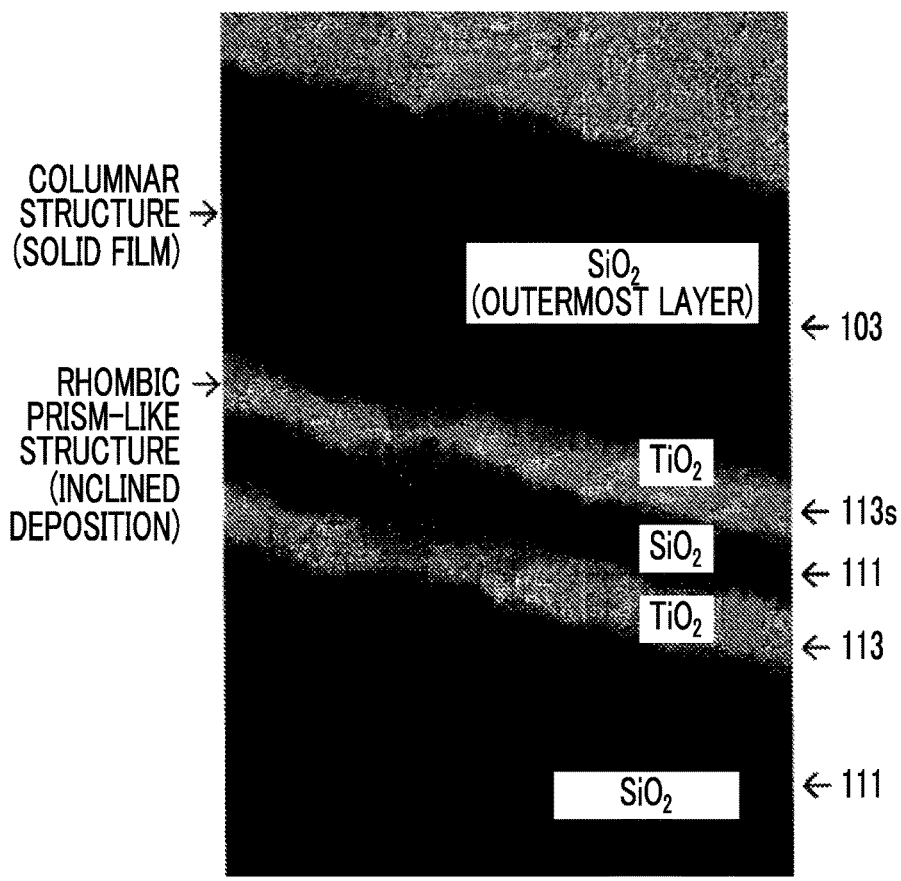
FIG. 2 is an electron microscopic image showing a magnified image of a cross section of the hydrophilic multilayer film according to an embodiment of the invention.

FIG. 1 is a schematic cross-sectional view illustrating an example of the outline configuration of a hydrophilic multilayer film according to an embodiment of the invention. FIG. 2 is an electron microscopic image showing a magnified image of the hydrophilic multilayer film according to an embodiment of the invention.

As illustrated in FIG. 1, the hydrophilic multilayer film 100 of an embodiment is formed on the surface of a transparent substrate 10. The substrate 10 is formed from glass, plastics, or the like and constitutes an optical element that is mainly used in optical devices, such as a flat plate, a concave lens or a convex lens, or a windowpane. The hydrophilic multilayer film 100 has, in sequence from the substrate 10 side, a multilayer film layer 101 in which at least two kinds of layers having different refractive indices are laminate such that at least one or more layers of each kind of layer are laminated; and a hydrophilic thin film layer 103 provided on the surface of the multilayer film layer 101.

The multilayer film layer 101 illustrated in FIG. 1 has a six-layer configuration in which layers having a low refractive index 111 and layers having a high refractive index 113 (113s) are alternately laminated. Examples of the material of the layer having a low refractive index 111 include silicon oxides, silicon oxynitride, gallium oxide, aluminum oxide, lanthanum oxide, lanthanum fluoride, magnesium fluoride, hydrogenated silicon oxides, and nitrided silicon oxides. FIG. 1 and FIG. 2 illustrate silicon oxide ($SiO_2$) as an example. Meanwhile, examples of the material of the layer having a high refractive index 113 (113s) include metal oxides having photocatalytic activity, such as titanium oxide, zinc oxide, iron oxide, and tungsten oxide. FIG. 1 and FIG. 2 illustrate titanium oxide ($TiO_2$) as an example. The refractive index of the layer having a low refractive index 111 means a refractive index that is lower than the refractive index of the material of the layer having a high refractive index 113. In the following description, the layer having a high refractive index 113 (113s) is referred to as "photocatalyst layer". The outermost layer of the multilayer film layer 101 on the reverse side of the substrate 10 is this photocatalyst layer 113.

The hydrophilic thin film layer 103 is formed on the surface of the multilayer film layer 101 and constitutes the outermost layer of the hydrophilic multilayer film 100. The material of the hydrophilic thin film layer 103 is a metal oxide having hydrophilicity, such as a silicon oxide, and has a refractive index that is lower than the refractive index of the photocatalyst layer 113. FIG. 1 and FIG. 2 illustrate silicon oxide ($SiO_2$) as an example.

As such, a multilayer film layer 101 in which layers having a low refractive index 111 and photocatalyst layers having a high refractive index 113 (113s) are alternately laminated is formed on the substrate 10, and in the outermost layer of the multilayer film layer 101, a photocatalyst layer 113 (113s) is formed, while a hydrophilic thin film layer 103 having a low refractive index is formed as an upper layer of this photocatalyst layer 113. Therefore, the hydrophilic multilayer film 100 in which the multilayer film layer 101 and the hydrophilic thin film layer 103 are laminated has several optical functions of an antireflection film, a reflective film, a half mirror film, and a band pass filter. The hydrophilic multilayer film 100 configured as an antireflection film is provided in, for example, a lens of an imaging system.

The multilayer film layer 101 and the hydrophilic thin film layer 103 that constitute the hydrophilic multilayer film 100 are formed using a vapor phase film-forming method such as vacuum vapor deposition. Particularly, at least one layer among one or more layers of the photocatalyst layer 113 and hydrophilic thin film layer 103 included in the multilayer film layer 101 is formed by inclined deposition that is carried out in a state in which the substrate 10 is inclined. At this time, the deposition material is deposited in a state of being inclined at the angle corresponding to the angle of inclination of the substrate 10 at the time of vapor deposition. As a result, the layer formed by inclined deposition has an oblique columnar structure, and gaps are formed between fine columnar structural bodies that stand close together in a direction oblique to the thickness direction of the layer. Furthermore, the face on the top surface side of the hydrophilic multilayer film 100 of the layer having an oblique columnar structure, that is, the face on the reverse side of the substrate 10, has a concavo-convex shape formed by the columnar structural bodies. Therefore, the layer formed on the layer having an oblique columnar structure is formed as a result of the material particles being vapor-deposited in a direction that is almost perpendicular to the substrate 10, and since the deposition material is deposited on convexities, the layer has a columnar structure. In the layer having a columnar structure, too, gaps are formed between the columnar structural bodies that stand upright with respect to the thickness direction of the layer. Meanwhile, a layer of the multilayer film layer 101, which is disposed closer to the substrate 10 side than the layer having an oblique columnar structure, is an isotropic and dense layer (so-called beta layer).

The angle of inclination of the gaps in the layer having an oblique columnar structure has a value in the range of 10 degrees to 85 degrees with respect to a plane parallel to the substrate 10, and more preferably has a value in the range of 30 degrees to 85 degrees. For example, in a case in which the angle of inclination is 30 degrees to 45 degrees, columnar structures are formed at a density of 90% to 96% in the upper layer of the layer having an oblique columnar structure, and in a case in which the angle of inclination is 45 degrees to 85 degrees, columnar structural bodies are formed at a density of 80% to 90% in the upper layer of the layer having an oblique columnar structure.

Figure 3:
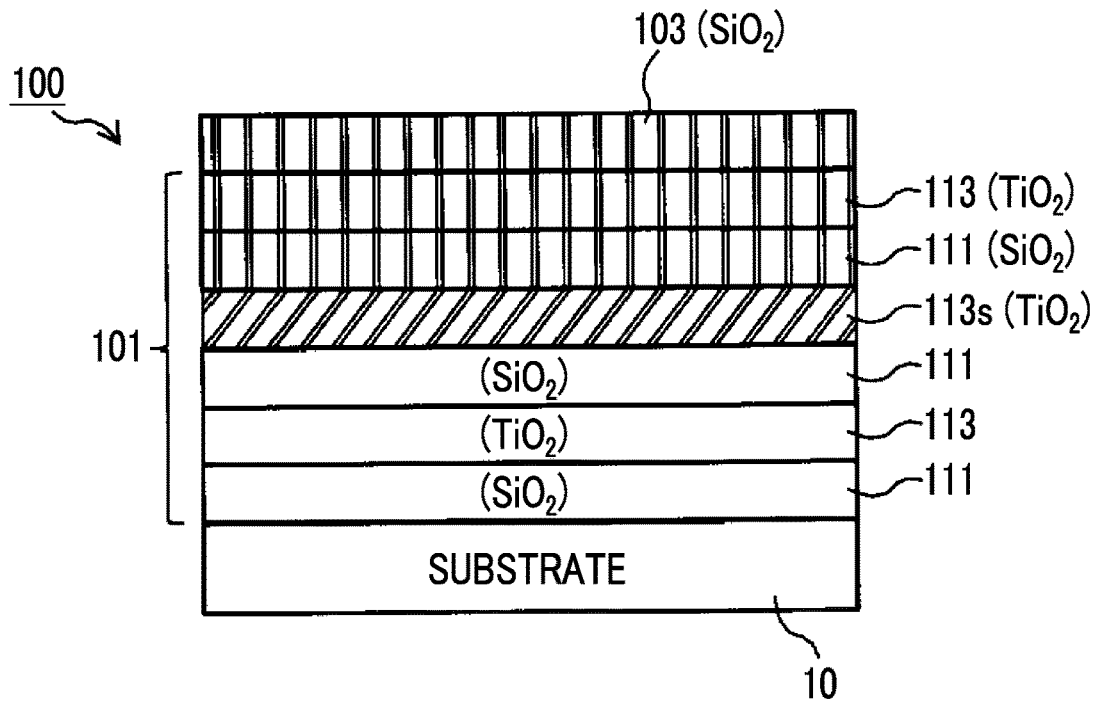
FIG. 3 is a schematic cross-sectional view illustrating another example of the outline configuration of a hydrophilic multilayer film according to an embodiment of the invention.
Figure 4:
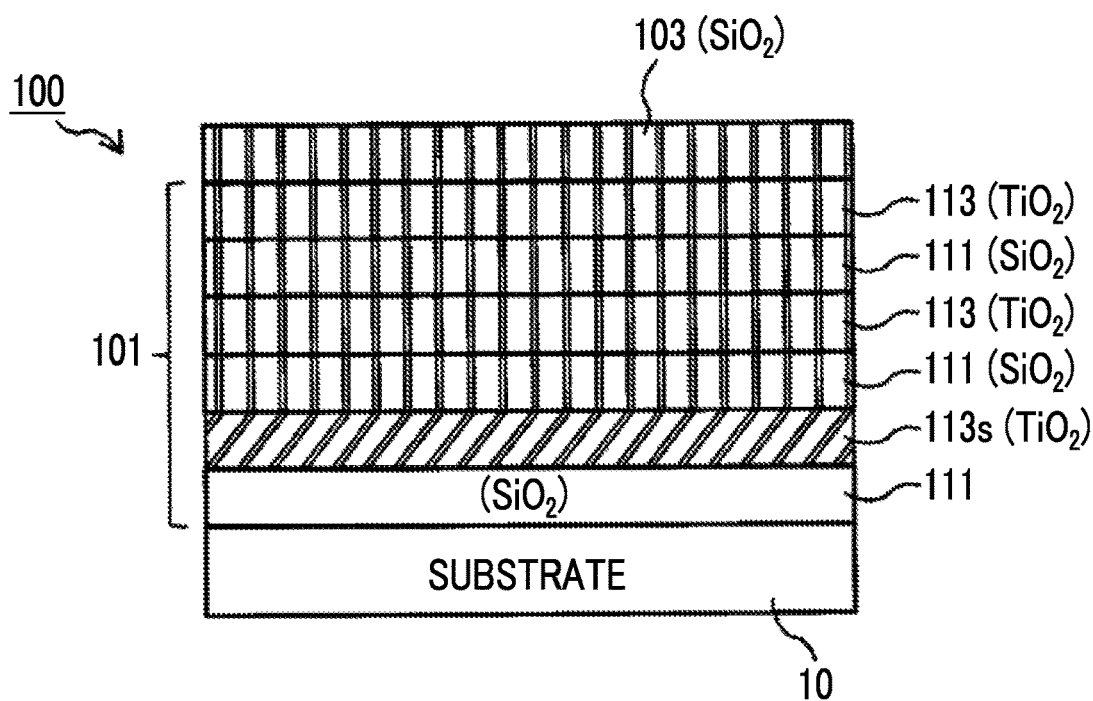
FIG. 4 is a schematic cross-sectional view illustrating another example of the outline configuration of a hydrophilic multilayer film according to an embodiment of the invention.
Figure 5:
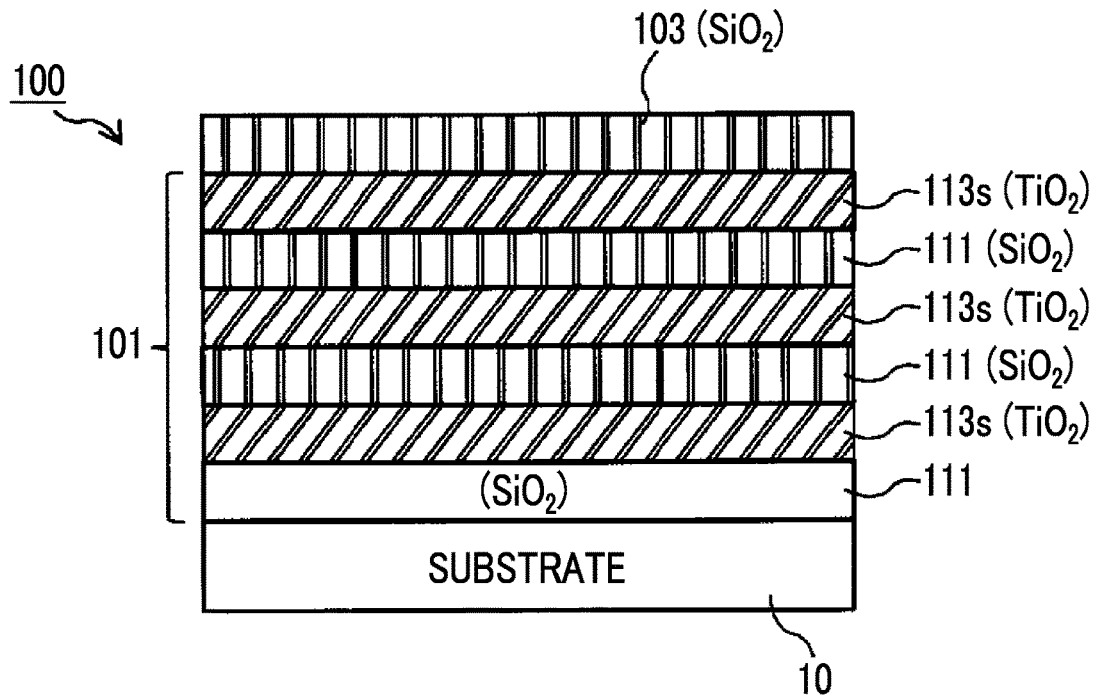
FIG. 5 is a schematic cross-sectional view illustrating another example of the outline configuration of a hydrophilic multilayer film according to an embodiment of the invention.

In the example shown in FIG. 1 and FIG. 2, a photocatalyst layer 113s that constitutes the first layer as counted from the surface side of the multilayer film layer 101 (face on the reverse side of the substrate 10) has an oblique columnar structure as a result of inclined deposition, and the hydrophilic thin film layer 103 formed on this photocatalyst layer 113s having an oblique columnar structure has a columnar structure. As illustrated in FIG. 3, in a case in which a photocatalyst layer 113s that constitutes a third layer as counted from the top surface side of the multilayer film layer 101 (face on the reverse side of the substrate 10) is formed by inclined deposition and has an oblique columnar structure, the second layer and the first layer of the multilayer film layer 101 formed on this photocatalyst layer 113s having an oblique columnar structure, and the hydrophilic thin film layer 103 have a columnar structure. Similarly, as illustrated in FIG. 4, in a case in which a photocatalyst layer 113s that constitutes a fifth layer as counted from the top surface side of the multilayer film layer 101 (face on the reverse side of the substrate 10) is formed by inclined deposition and has an oblique columnar structure, the fourth layer to the first layer of the multilayer film layer 101 formed on this photocatalyst layer 113s having an oblique columnar structure, and the hydrophilic thin film layer 103 have a columnar structure. Furthermore, as illustrated in FIG. 5, in a case in which various photocatalyst layers 113s that constitute the fifth layer, the third layer, and the first layer as counted from the top surface side of the multilayer film layer 101 (face on the reverse side of the substrate 10) are formed by inclined deposition and has an oblique columnar structure, the fourth layer and the second layer of the multilayer film layer 101 formed on these photocatalyst layers 113s having an oblique columnar structure, and the hydrophilic thin film layer 103 have a columnar structure.

As described above, in the present embodiment, at least one layer of the photocatalyst layers 113 (113s) included in the multilayer film layer 101 is formed by inclined deposition, and the photocatalyst layers 113s formed by inclined deposition have an oblique columnar structure in which fine columnar structural bodies stand close together in a direction oblique to the thickness direction of the layer. The face on the top surface side of the photocatalyst layer 113s (reverse side of the substrate 10) having an oblique columnar structure has a concavo-convex shape formed by columnar structural bodies. Therefore, a layer formed on a photocatalyst layer 113s having an oblique columnar structure has a columnar structure because the deposition material is deposited on convexities. In the layer having a columnar structure, since gaps are formed between columnar structural bodies that stand upright in the thickness direction of the layer, layers having a columnar structure including the hydrophilic thin film layer 103 have high hydrophilicity caused by a capillary phenomenon. Furthermore, electrons generated by the photocatalytic action of the photocatalyst layer 113s included in the multilayer film layer 101 move through the columnar structure, or the gaps formed inside the layer having an oblique columnar structure, and these electrons contribute to the production of active oxygen or hydroxyl radical (OH radical) at the surface of the hydrophilic multilayer film 100. As the active oxygen or OH radical thus produced oxidatively decompose organic materials (contaminants) adhering to the surface of the hydrophilic multilayer film 100, self-cleaning is achieved. In the present embodiment, since the gaps inside the layer in which electrons produced by the photocatalytic action of the photocatalyst layer 113s are approximately linear pathways that are in communication to the surface of the hydrophilic multilayer film 100, electrons can efficiently move to the surface of the hydrophilic multilayer film 100. Accordingly, oxidative decomposition of organic materials adhering to the surface of the hydrophilic multilayer film 100 (self-cleaning) is highly efficiently carried out. As such, a balance can be achieved between high hydrophilicity and an efficient self-cleaning function in the hydrophilic multilayer film 100.

Figure 6:
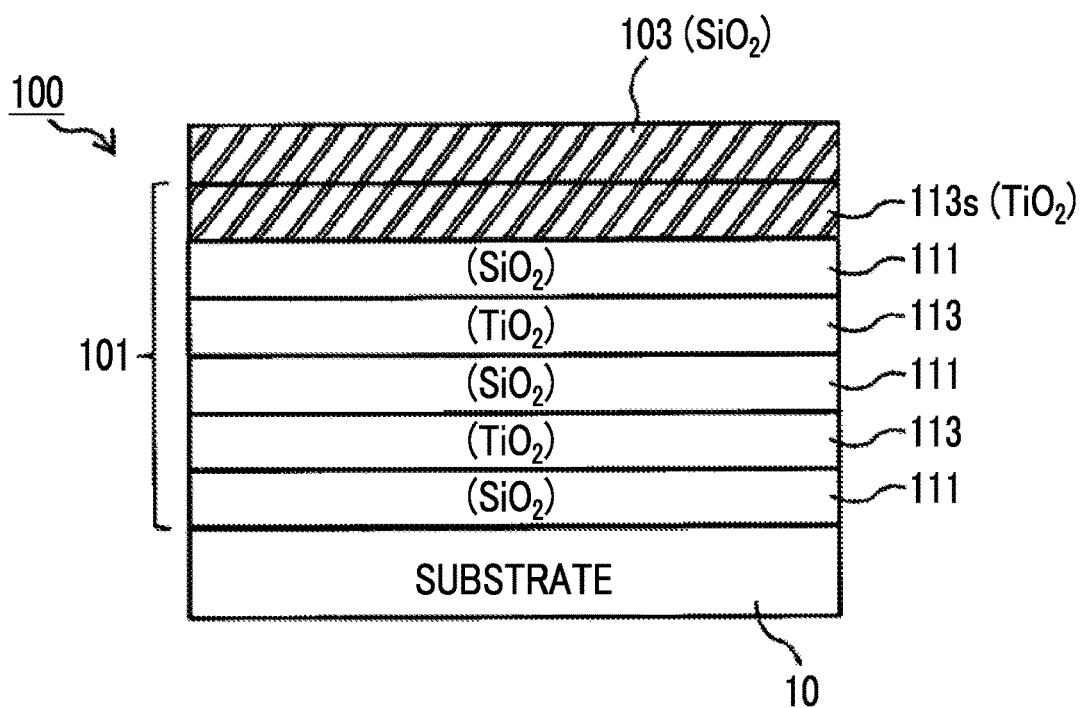
FIG. 6 is a schematic cross-sectional view illustrating another example of the outline configuration of a hydrophilic multilayer film according to an embodiment of the invention.

As illustrated in FIG. 6, the hydrophilic thin film layer 103 that is formed on the photocatalyst layer 113s having an oblique columnar structure, or another layer of the multilayer film layer 101 may also be formed by inclined deposition. In this case, the hydrophilic thin film layer 103 that is formed on the photocatalyst layer 113s having an oblique columnar structure also has an oblique columnar structure. In the hydrophilic thin film layer 103 having an oblique columnar structure, since gaps are formed between columnar structural bodies that stand close together in a direction oblique to the thickness direction of the hydrophilic thin film layer, layers having au oblique columnar structure, including the hydrophilic thin film layer 103, are highly hydrophilic due to the capillary phenomenon. Furthermore, electrons produced by the photocatalytic action of the photocatalyst layer 113s included in the multilayer film layer 101 move through the gaps formed inside a layer having an inclined columnar structure; however, since the gaps are approximately linear pathways that are in communication with the surface of the hydrophilic multilayer film 100, electrons can efficiently move to the surface of the hydrophilic multilayer film 100. Therefore, oxidative decomposition of organic materials adhering to the surface of the hydrophilic multilayer film 100 (self-cleaning) is highly efficiently carried out. As such, even with the configuration illustrated in FIG. 6, a balance can be achieved between high hydrophilicity and an efficient self-cleaning function in the hydrophilic multilayer film 100.

EXAMPLES

Hereinafter, Examples of the present invention will be explained, and also, the configuration and effects of the invention will be described in more detail.

Examples 1 to 6 and Comparative Example 1

FIG. 7 is a table showing the layer configurations of the substrate 10 and the hydrophilic multilayer film 100 in Examples 1 to 6 and Comparative Example 1, the materials and film thicknesses [nm] of the various layers, and the average reflectivity, hydrophilicity and abrasion resistance of the various Examples and Comparative Example 1. The average reflectance is a value determined by dividing the sum of values obtained by measuring the reflectance in the wavelength range of 400 nm to 700 nm at an interval of 1 nm, by the number of reflecting points. In a case in which the hydrophilic multilayer film 100 is an antireflection film, it is desirable that the average reflectance is 0.5% or less for practical use. The hydrophilicity is the contact angle [deg] of water obtainable after perforating a wax test (application of wax→washing→irradiation with UV (ultraviolet) light), and it is desirable that the hydrophilicity is 10 deg or less for practical use. The abrasion resistance represents the presence or absence of film peeling at the time of performing a rubbing test (added load 100 g/cm$^2$) using a commercially available scrub brush. Grade "A" representing a result of abrasion resistance implies that film peeling did not occur even if the film was rubbed 100 times; and grade "B" implies that film peeling occurred after the film was rubbed 50 times.

Figure 12:
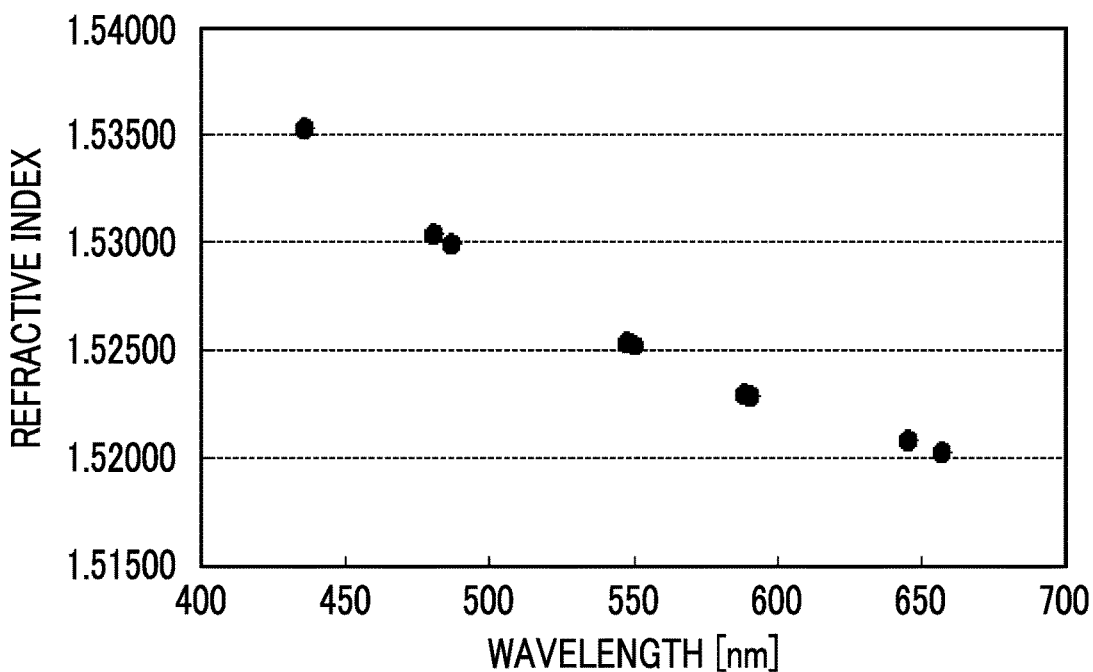
FIG. 12 is a graph showing the relation between the wavelength and the refractive index in "D 263 T" used as the substrate 10 in Examples 1 to 3 and Comparative Example 1.
Figure 13:
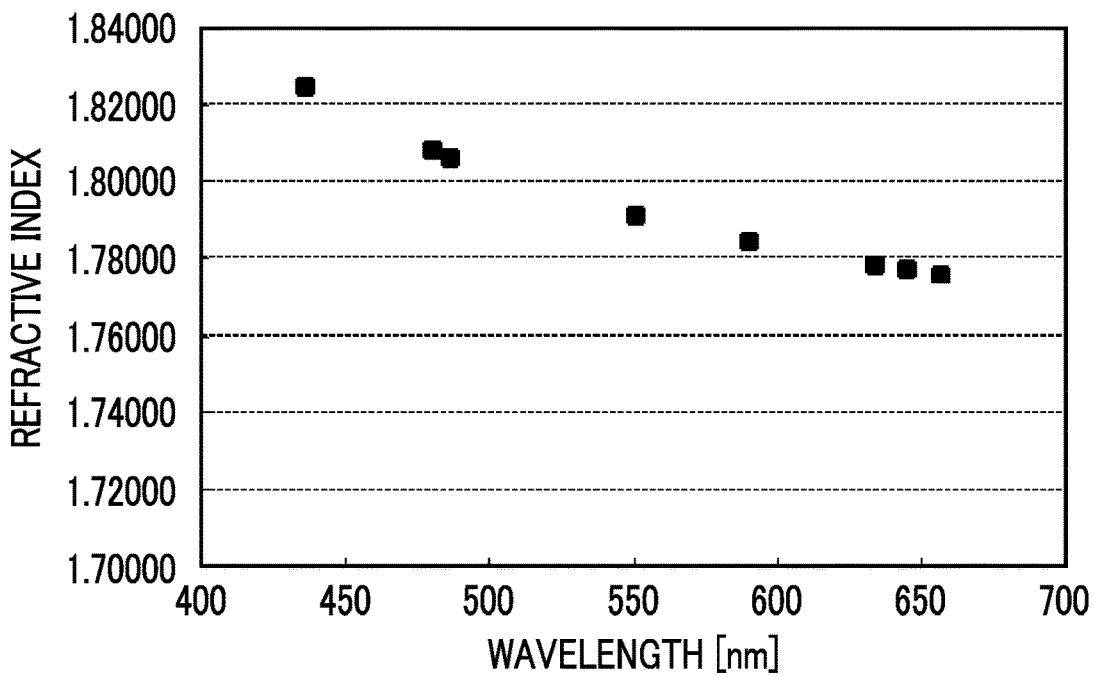
FIG. 13 is a graph showing the relation between the wavelength and the refractive index in "FD110" used as the substrate 10 in Examples 4 to 6.

In Examples 1 to 3 and Comparative Example 1, "D 263 T" (manufactured by Schott AG) having a low refractive index (wavelength 550 nm) of 1.52527 is used as a substrate 10. FIG. 12 shows the relation between the wavelength and the refractive index for "D 263 T", which is used as the substrate 10 in Examples 1 to 3 and Comparative Example 1. In Examples 4 to 6, "FD110" (manufactured by Hoya Corporation) having a high refractive index of 1.79123 is used as the substrate 10. FIG. 13 shows the relation between the wavelength and the refractive index for "FD110", which is used as the substrate 10 in Examples 4 to 6. In Examples 1 to 6 and Comparative Example 1, six layers (four layers in Example 3 only) of multilayer film layer 101 were laminated on the substrate 10, and a hydrophilic thin film layer 103 was laminated thereon as the outermost layer of the hydrophilic multilayer film 100. The multilayer film layer according to Comparative Example 1 was not formed by inclined deposition, and therefore, the multilayer film layer is a so-called solid film. Accordingly, the hydrophilic thin film layer formed as an upper layer thereof is also a solid film. Meanwhile, in Examples 1 to 6, since the first layer of the multilayer film layer 101 is formed by inclined deposition, the first layer has an oblique columnar structure. In FIG. 7, the numerical value representing the film thickness of the first layer of the multilayer film layer 101 having an oblique columnar structure is surrounded by a double line. Since the first layer of the multilayer film layer 101 has an oblique columnar structure, the hydrophilic thin film layer 103 formed as an upper layer thereof has a columnar structure.

As shown in FIG. 7, in Comparative Example 1, since the average reflectance is 0.18%, which is 0.5% or less, the antireflection function is sufficient; however, the contact angle representing hydrophilicity is high, such as 15.2 deg. Meanwhile, in Examples 1 to 6, the average reflectivity are all 0.5% or less, and the contact angles representing hydrophilicity are all 10 deg or less. Furthermore, Examples 1 to 6 have high abrasion resistance to the extent that film peeling does not occur even if the film is rubbed 100 times. As such, the hydrophilic multilayer films 100 of Examples 1 to 6 are highly hydrophilic antireflection films having high abrasion resistance. Furthermore, since the first layer of the multilayer film layer 101 has an oblique columnar structure, and the hydrophilic thin film layer 103 formed as an upper layer thereof has a columnar structure, an efficient self-cleaning function can be realized.

Examples 7 to 10 and Comparative Example 1

FIG. 8 is a table showing the layer configurations of the substrate 10 and the hydrophilic multilayer film 100 in Examples 7 to 10 and Comparative Example 1, the materials and film thicknesses [nm] of the various layers, and the average reflectivity, hydrophilicity and abrasion resistance of the various Examples and Comparative Example 1. In Examples 7 and 8 and Comparative Example 1, "D 263 T" (manufactured by Schott AG) of a low refractive index member is used as a substrate 10, and in Examples 9 and 10, "FD110" (manufactured by Hoya Corporation) of a high refractive index member is used as the substrate 10. In Examples 7 to 10 and Comparative Example 1, six layers (four layers in Example 8 only) of multilayer film layer 101 were laminated on the substrate 10, and a hydrophilic thin film layer 103 was laminated thereon as the outermost layer of the hydrophilic multilayer film 100. The multilayer film layer according to Comparative Example 1 was not formed by inclined deposition, and therefore, the multilayer film layer is a so-called solid film. Accordingly, the hydrophilic thin film layer formed as an upper layer thereof is also a solid film. Meanwhile, in Examples 7 to 10, since the third layer of the multilayer film layer 101 is formed by inclined deposition, the third layer has an oblique columnar structure. In FIG. 8, the value representing the film thickness of the third layer of the multilayer film layer 101 having an oblique columnar structure is surrounded by a double line. Since the third layer of the multilayer film layer 101 has an oblique columnar structure, the second layer and the first layer of the multilayer film layer 101 and the hydrophilic thin film layer 103, which are formed as upper layers of the third layer, have a columnar structure.

As shown in FIG. 8, in Comparative Example 1, since the average reflectance is 0.18%, which is 0.5% or less, the antireflection function is sufficient; however, the contact angle representing hydrophilicity is high, such as 15.2 deg. Meanwhile, in Examples 7 to 10, the average reflectivity are all 0.5% or less, and the contact angles representing hydrophilicity are all 10 deg or less. Furthermore, Examples 7 to 10 have high abrasion resistance to the extent that film peeling does not occur even if the film is rubbed 100 times. As such, the hydrophilic multilayer films 100 of Examples 7 to 10 are highly hydrophilic antireflection films having high abrasion resistance. Furthermore, since the third layer of the multilayer film layer 101 has an oblique columnar structure, and the second layer and the first layer of the multilayer film layer 101 and the hydrophilic thin film layer 103, which are formed as upper layers of the third layer, have a columnar structure, an efficient self-cleaning function can be realized.

Examples 11 and 12 and Comparative Example 2

FIG. 9 is a table showing the layer configurations of the substrate 10 and the hydrophilic multilayer film 100 in Examples 11 and 12 and Comparative Example 2, the materials and film thicknesses [nm] of the various layers, and the average reflectivity, hydrophilicity and abrasion resistance of the various Examples and Comparative Example 2. In Examples 11 and 12 and Comparative Example 2, "FD110" (manufactured by Hoya Corporation) of a high refractive index member is used as the substrate 10. In Examples 11 and 12 and Comparative Example 2, six layers of multilayer film layer 101 were laminated on the substrate 10, and a hydrophilic thin film layer 103 was laminated thereon as the outermost layer of the hydrophilic multilayer film 100. The multilayer film layer according to Comparative Example 2 was not formed by inclined deposition, and therefore, the multilayer film layer is a so-called solid film. Accordingly, the hydrophilic thin film layer formed as an upper layer thereof is also a solid film. Meanwhile, in Examples 11 and 12, since the fifth layer of the multilayer film layer 101 is formed by inclined deposition, the fifth layer has an oblique columnar structure. In FIG. 9, the numerical value representing the film thickness of the fifth layer of the multilayer film layer 101 having an oblique columnar structure is surrounded by a double line. Since the fifth layer of the multilayer film layer 101 has an oblique columnar structure, the fourth layer to the first layer of the multilayer film layer 101 and the hydrophilic thin film layer 103, which are formed as upper layers of the fifth layer, have a columnar structure.

As shown in FIG. 9, in Comparative Example 2, since the average reflectance is 0.24%, which is 0.5% or less, the antireflectiou function is sufficient; however, the contact angle representing hydrophilicity is high, such as 16.6 deg. Meanwhile, in Examples 11 and 12, the average reflectivity are all 0.5% or less, and the contact angles representing hydrophilicity are all 10 deg or less. Furthermore, Examples 11 and 12 have high abrasion resistance to the extent that film peeling does not occur even if the film is rubbed 100 times. As such, the hydrophilic multilayer films 100 of Examples 11 and 12 are highly hydrophilic antireflection films having high abrasion resistance. Furthermore, since the fifth layer of the multilayer film layer 101 has an oblique columnar structure, and the fourth layer to the first layer of the multilayer film layer 101 and the hydrophilic thin film layer 103, which are formed as upper layers of the third layer, have a columnar structure, an efficient self-cleaning function can be realized.

Examples 13 and 14 and Comparative Example 2

FIG. 10 is a table showing the layer configurations of the substrate 10 and the hydrophilic multilayer film 100 in Examples 13 and 14 and Comparative Example 2, the materials and film thicknesses [nm] of the various layers, and the average reflectivity, hydrophilicity and abrasion resistance of the various Examples and Comparative Example 2. In Examples 13 and 14 and Comparative Example 2, "FD110" (manufactured by Hoya Corporation) of a high refractive index member is used as the substrate 10. In Examples 13 and 14 and Comparative Example 2, six layers of multilayer film layer 101 were laminated on the substrate 10, and a hydrophilic thin film layer 103 was laminated thereon as the outermost layer of the hydrophilic multilayer film 100. The multilayer film layer according to Comparative Example 2 was not formed by inclined deposition, and therefore, the multilayer film layer is a so-called solid film. Accordingly, the hydrophilic thin film layer formed as an upper layer thereof is also a solid film. Meanwhile, in Examples 13 and 14, since the fifth layer, the third layer, and the first layer of the multilayer film layer 101 are formed by inclined deposition, the fifth layer, the third layer, and the first layer have an oblique columnar structure. In FIG. 10, the numerical values representing the film thicknesses of the fifth layer, the third layer, and the first layer of the multilayer film layer 101 having an oblique columnar structure are surrounded by double lines. Since the fifth layer, the third layer, and the first layer of the multilayer film layer 101 have an oblique columnar structure, the fourth layer and the second layer of the multilayer film layer 101 and the hydrophilic thin film layer 103, which are formed as upper layers, have a columnar structure.

As shown in FIG. 10, in Comparative Example 2, since the average reflectance is 0.24%, which is 0.5% or less, the antireflectiou function is sufficient; however, the contact angle representing hydrophilicity is high, such as 16.6 deg. Meanwhile, in Examples 13 and 14, the average reflectivity are all 0.5% or less, and the contact angles representing hydrophilicity are all 10 deg or less. Furthermore, Examples 13 and 14 have high abrasion resistance to the extent that film peeling does not occur even if the film is rubbed 100 times. As such, the hydrophilic multilayer films 100 of Examples 13 and 14 are highly hydrophilic antireflection films having high abrasion resistance. Furthermore, since the fifth layer, the third layer, and the first layer of the multilayer film layer 101 have an oblique columnar structure, and the fourth layer and the second layer of the multilayer film layer 101 and the hydrophilic thin film layer 103, which are formed as upper layers, have a columnar structure, an efficient self-cleaning function can be realized.

Examples 15 and 16 and Comparative Example 3

FIG. 11 a table showing the layer configurations of the substrate 10 and the hydrophilic multilayer film 100 in Examples 15 and 16 and Comparative Example 3, the materials and film thicknesses [nm] of the various layers, and the average reflectivity, hydrophilicity and abrasion resistance of the various Examples and Comparative Example 1. In Example 15 and Comparative Example 3, "D 263 T" (manufactured by Schott AG) of a low refractive index member is used as the substrate 10, and in Example 16, "FD110" (manufactured by Hoya Corporation) of a high refractive index member is used as the substrate 10. In Example 15 and Comparative Example 3, four layers of multilayer film layer 101 were laminated on the substrate 10, and in Example 16, six layers of multilayer film layer 101 were laminated on the substrate 10. A hydrophilic thin film layer 103 was laminated thereon as the outermost layer of the hydrophilic multilayer film 100. The multilayer film layer according to Comparative Example 3 was not formed by inclined deposition, and therefore, the multilayer film layer is a so-called solid film. Accordingly, the hydrophilic thin film layer formed as an upper layer thereof is also a solid film. Meanwhile, in Examples 15 and 16, since both the first layer of the multilayer film layer 101 and the hydrophilic thin film layer 103 were formed by inclined deposition, these layers have an oblique columnar structure. In FIG. 11, the numerical value representing the film thickness of the first layer of the multilayer film layer 101 having an oblique columnar structure and the value representing the film thickness of the hydrophilic thin film layer 103 are surrounded by double lines.

As shown in FIG. 11, in Comparative Example 3, since the average reflectance is 0.38%, which is 0.5% or less, the antireflection function is sufficient; however, the contact angle representing hydrophilicity is high, such as 15.2 deg. Meanwhile, in Examples 15 and 16, the average reflectivity are all 0.5% or less, and the contact angles representing hydrophilicity are all 10 deg or less. Furthermore, Examples 15 and 16 have abrasion resistance to the extent that film peeling occurs after being rubbed 50 times. As such, the hydrophilic multilayer films 100 of Examples 15 and 16 are highly hydrophilic antireflection films having abrasion resistance at a practically useful level. Furthermore, since the first layer of the multilayer film layer 101 and the hydrophilic thin film layer 103 both have an oblique columnar structure, an efficient self-cleaning function can be realized.

As explained above, the hydrophilic multilayer film disclosed in the present specification is a hydrophilic multilayer film provided on the surface of a substrate, the hydrophilic multilayer film having, in sequence from the substrate side, a multilayer film layer in which at least two kinds of layers having different refractive indices are laminated such that at least one or more layers of each kind of layer are laminated; and a hydrophilic thin film layer provided on the surface of the multilayer film layer, wherein the multilayer film layer has one or more photocatalyst layers, one layer of the photocatalyst layers is provided adjacently to the hydrophilic thin film layer, the hydrophilic thin film layer has a columnar structure having gaps extending between the top surface of the hydrophilic multilayer film and the face adjacent to the photocatalyst layer, and one or more of the photocatalyst layers included in the multilayer film layer have an oblique columnar structure including gaps that are oblique to the thickness direction.

Furthermore, the hydrophilic thin film layer has the columnar structure described above, and at least one layer of the photocatalyst layers included in the multilayer film layer has the oblique columnar structure described above.

The hydrophilic thin film layer and at least one layer of the photocatalyst layers included in the multilayer film layer have the oblique columnar structure described above.

The angle of inclination described above has a value in the range of 10 degrees to 85 degrees with respect to a plane parallel to the substrate.

A face of the photocatalyst layer having the oblique columnar structure, the face being on the surface side of the hydrophilic multilayer film, has a concavo-convex shape.

The hydrophilic thin film layer is formed from silicon oxide, and the photocatalyst layer is formed from titanium oxide.

In the multilayer film layer, layers formed from titanium oxide and layers formed from silicon oxide are alternately laminated.

The hydrophilic multilayer film has several optical functions of an antireflection film, a reflective film, a half mirror film, and a band pass filter film.

The imaging system disclosed in the present specification has the hydrophilic multilayer film as an antireflection film on a face that is in contact with the outside air.

The method for producing a hydrophilic multilayer film disclosed in the present specification is a method for producing a hydrophilic multilayer film having, on the surface of a substrate, a multilayer film layer in which at least two kinds of layers having different refractive indices are laminated in sequence from the substrate side such that at least one or more layers of each kind of layer are laminated; and a hydrophilic thin film layer provided on the surface of the multilayer film layer, in which the multilayer film layer has one or more photocatalyst layers, and one layer of the photocatalyst layers is provided adjacently to the hydrophilic thin film layer, the method including forming one or more of the photocatalyst layers included in the multilayer film layer by inclined deposition.

The invention has been described in detail with reference to particular embodiments; however, it will be obvious to those ordinarily skilled in the art that various modifications and alterations can be made without deviating from the spirit and the scope of the invention.

What is claimed is:

1. A hydrophilic multilayer film provided on a surface of a substrate, the hydrophilic multilayer film comprising:
    a multilayer film layer in which at least two kinds of layers having different refractive indices are laminated in order from the substrate side such that at least one or more layers of each kind of layer are laminated; and
    a hydrophilic thin film layer provided on the surface of the multilayer film layer,
    wherein the multilayer film layer has one or more photocatalyst layers, and one layer of the photocatalyst layers is provided adjacently to the hydrophilic thin film layer,
    the hydrophilic thin film layer has a columnar structure, and
    one or more of the photocatalyst layers included in the multilayer film layer have an oblique columnar structure.

2. The hydrophilic multilayer film according to claim 1, wherein the photocatalyst layer provided adjacently to the hydrophilic thin film layer has an oblique columnar structure.

3. The hydrophilic multilayer film according to claim 1, wherein the hydrophilic thin film layer has an oblique columnar structure.

4. The hydrophilic multilayer film according to claim 1, wherein the hydrophilic thin film has an oblique columnar structure having gaps extending between a top surface of the hydrophilic multilayer film and a face adjacent to the photocatalyst layer.

5. The hydrophilic multilayer film according to claim 1, wherein one or more of the photocatalyst layers included in the multilayer film layer have an oblique columnar structure including gaps that are oblique to a thickness direction.

6. The hydrophilic multilayer film according to claim 1, wherein the hydrophilic thin film layer has a columnar structure having gaps extending between a top surface of the hydrophilic multilayer film and a face adjacent to the photocatalyst layer, and
    one or more of the photocatalyst layers included in the multilayer film layer have an oblique columnar structure including gaps that are oblique to a thickness direction.

7. The hydrophilic multilayer film according to claim 1, wherein an angle of inclination has a value in a range of 10 degrees to 85 degrees with respect to a plane parallel to the substrate.

8. The hydrophilic multilayer film according to claim 1, wherein a face of the photocatalyst layer having the oblique columnar structure, the face being on a surface side of the hydrophilic multilayer film, has a concavo-convex shape.

9. The hydrophilic multilayer film according to claim 1, wherein the hydrophilic thin film layer is formed from silicon oxide, and the photocatalyst layer is formed from titanium oxide.

10. The hydrophilic multilayer film according to claim 9, wherein in the multilayer film layer, a layer formed from titanium oxide and a layer formed from silicon oxide are alternately laminated.

11. The hydrophilic multilayer film according to claim 1, wherein the hydrophilic multilayer film has any optical functions of an antireflection film, a reflective film, a half mirror film, and a band pass filter film.

12. An imaging system comprising:
the antireflection film according to claim 11 on a face that is in contact with outside air.

13. A method for producing a hydrophilic multilayer film having, on a surface of a substrate, a multilayer film layer in which at least two kinds of layers having different refractive indices are laminated in order from the substrate side such that at least one or more layers of each kind of layer are laminated; and a hydrophilic thin film layer provided on the surface of the multilayer film layer, in which the multilayer film layer has one or more photocatalyst layers, and one layer of the photocatalyst layers is provided adjacently to the hydrophilic thin film layer, the method comprising:
forming one or more of the photocatalyst layers included in the multilayer film layer by inclined deposition.

* * * * *